(12) United States Patent
Colman

(10) Patent No.: US 7,232,144 B2
(45) Date of Patent: Jun. 19, 2007

(54) FOLDING BICYCLE

(76) Inventor: Eduardo Colman, 201 Madison St., Mamaroneck, NY (US) 10543

( * ) Notice: Subject to any disclaimer, the term of this patent is extended or adjusted under 35 U.S.C. 154(b) by 132 days.

(21) Appl. No.: 11/146,682

(22) Filed: Jun. 7, 2005

(65) Prior Publication Data

US 2007/0007744 A1    Jan. 11, 2007

(51) Int. Cl.
*B62K 3/02* (2006.01)
(52) U.S. Cl. .................. 280/287; 280/220; 280/278
(58) Field of Classification Search ............ 280/220, 280/278, 287
See application file for complete search history.

(56) References Cited

U.S. PATENT DOCUMENTS

| | | | |
|---|---|---|---|
| 645,145 A * | 3/1900 | Trebert | ............ 280/278 |
| 3,015,498 A | 1/1962 | Tanaka et al. | |
| 3,362,725 A | 1/1968 | Dolphin | |
| 3,374,009 A | 3/1968 | Jeunet | |
| 3,905,618 A | 9/1975 | Miranda | |
| 4,002,351 A * | 1/1977 | Zuck | ............ 280/278 |
| 4,111,447 A | 9/1978 | Ishida | |
| 4,440,414 A | 4/1984 | Wang | |
| 4,441,729 A | 4/1984 | Underwood | |
| 4,460,191 A | 7/1984 | Ishibashi et al. | |
| 4,462,606 A | 7/1984 | Hon | |
| 4,824,131 A | 4/1989 | Thay | |
| 4,842,292 A | 6/1989 | Wang | |
| 5,052,706 A | 10/1991 | Tsai et al. | |
| 5,069,468 A | 12/1991 | Tsai et al. | |
| 5,149,119 A | 9/1992 | Hwang | |
| 5,193,834 A | 3/1993 | Strozyk | |
| 5,590,895 A | 1/1997 | Hiramoto | |
| 5,785,338 A | 7/1998 | Chang | |
| 5,836,602 A | 11/1998 | Wang | |
| 6,116,629 A | 9/2000 | Koppensteiner | |
| 6,196,566 B1 | 3/2001 | Zhang | |
| 6,286,848 B1 | 9/2001 | Augustin | |
| 6,364,335 B1 | 4/2002 | Mombelli | |
| 6,595,539 B1 | 7/2003 | Belli | |
| 6,641,159 B1 | 11/2003 | Fan | |
| 6,688,625 B1 | 2/2004 | Schreuder et al. | |
| 6,702,312 B1 | 3/2004 | Miksik | |
| 6,799,771 B2 | 10/2004 | Bigot | |
| 2003/0114274 A1 | 6/2003 | Chang et al. | |
| 2004/0000770 A1 | 1/2004 | Miksik | |
| 2004/0056452 A1 * | 3/2004 | Mihelic | ............ 280/641 |
| 2005/0001404 A1 | 1/2005 | Mihelic | |

* cited by examiner

*Primary Examiner*—Lesley D. Morris
*Assistant Examiner*—Marlon Arce-Diaz
(74) *Attorney, Agent, or Firm*—Gottlieb, Rackman & Reisman, P.C.

(57) ABSTRACT

A folding or collapsible bicycle includes a bifurcated solid frame defining a first storage space and a second storage space. The front and rear wheels are held by pivoting forks that can be selectively moved from an operational position to a closed position in the closed position, the front wheel is disposed in the first storage space and the rear wheel is disposed in the second storage space.

10 Claims, 11 Drawing Sheets

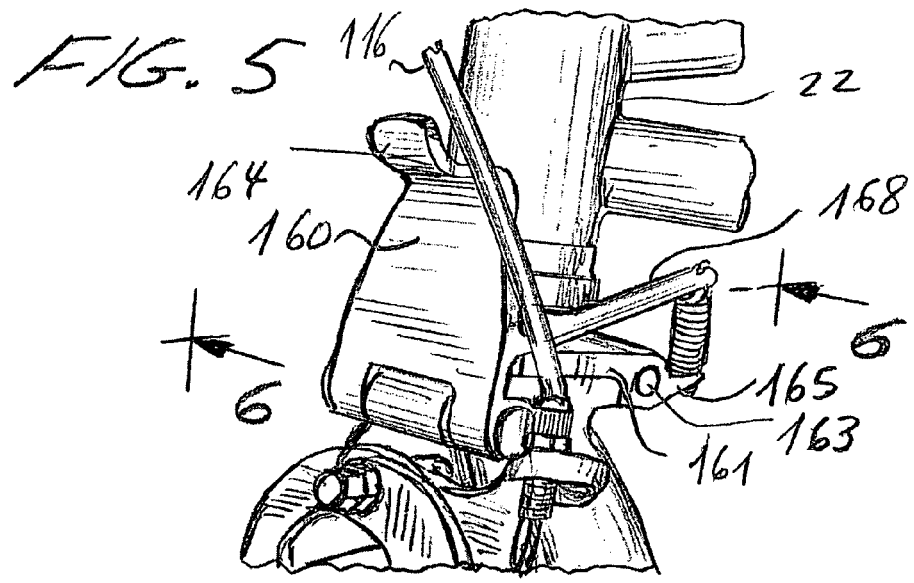
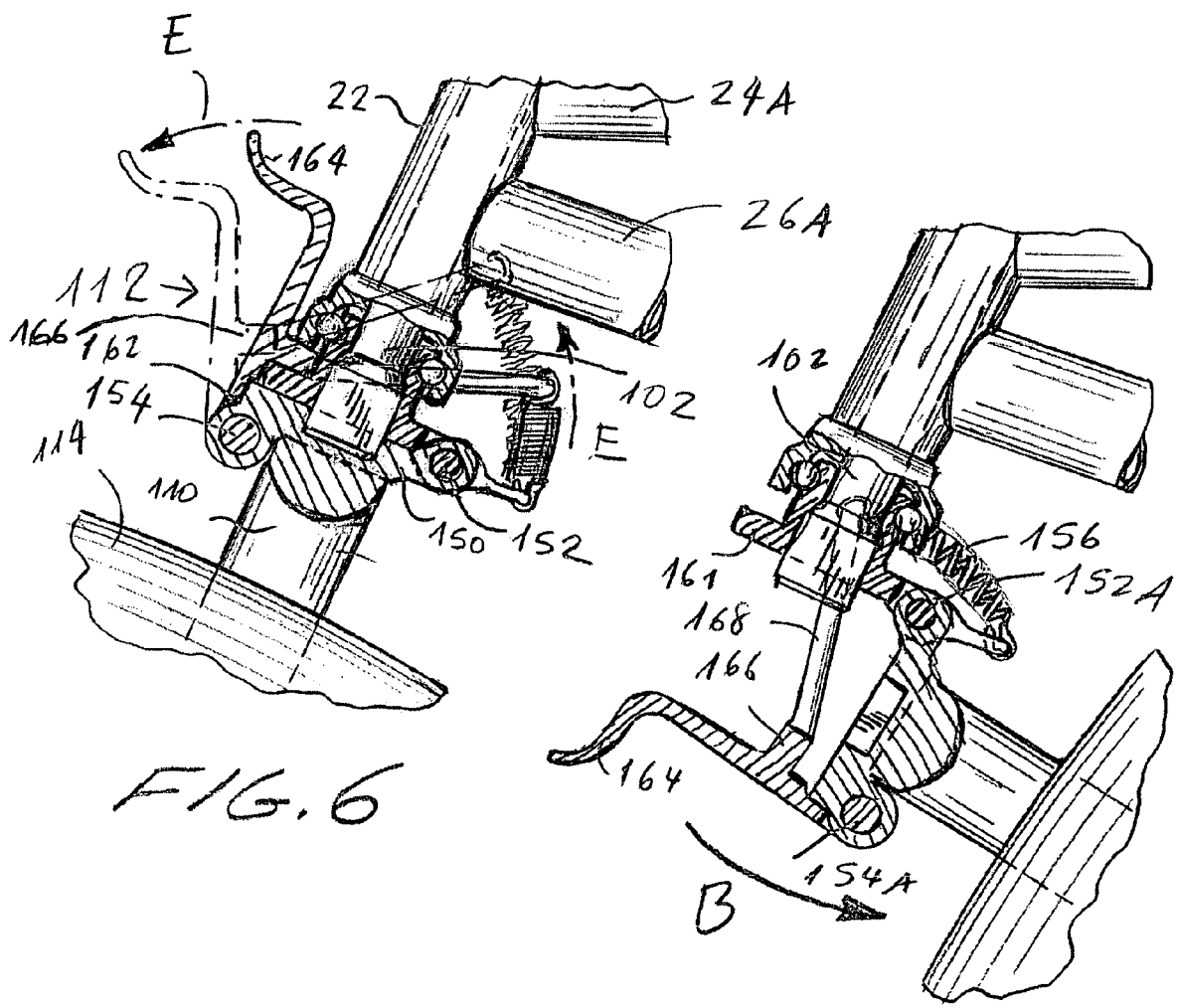

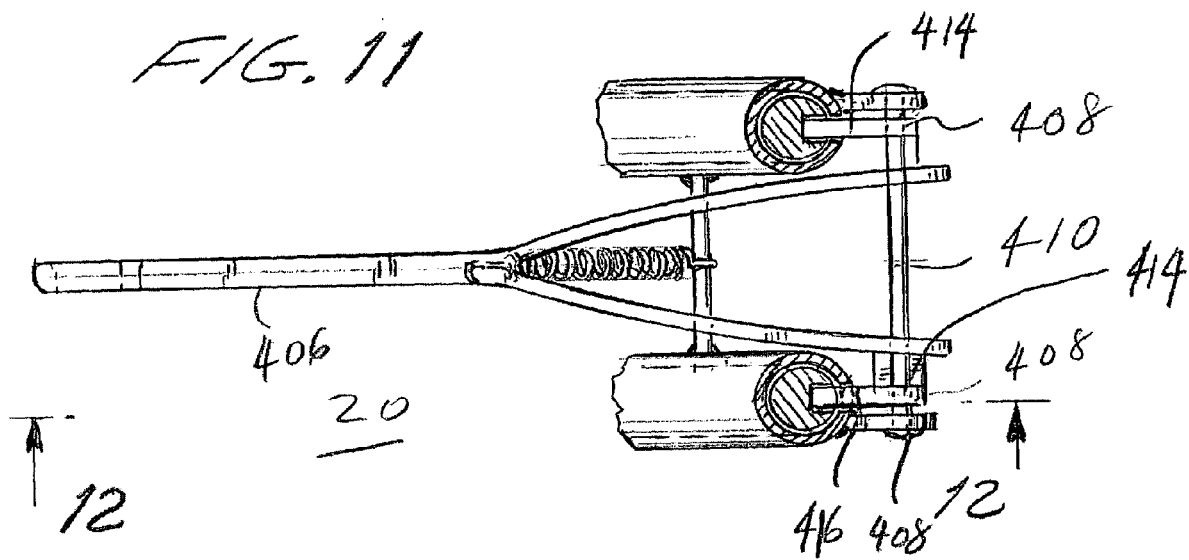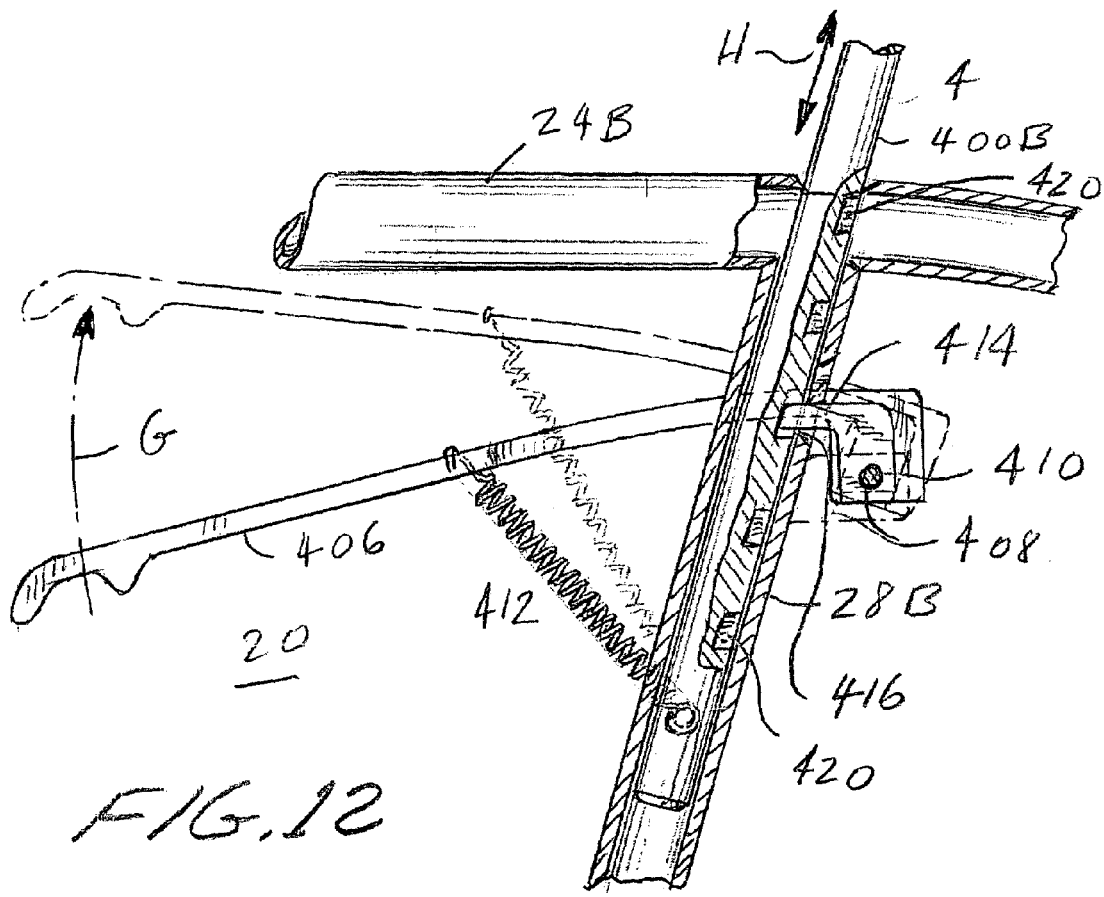

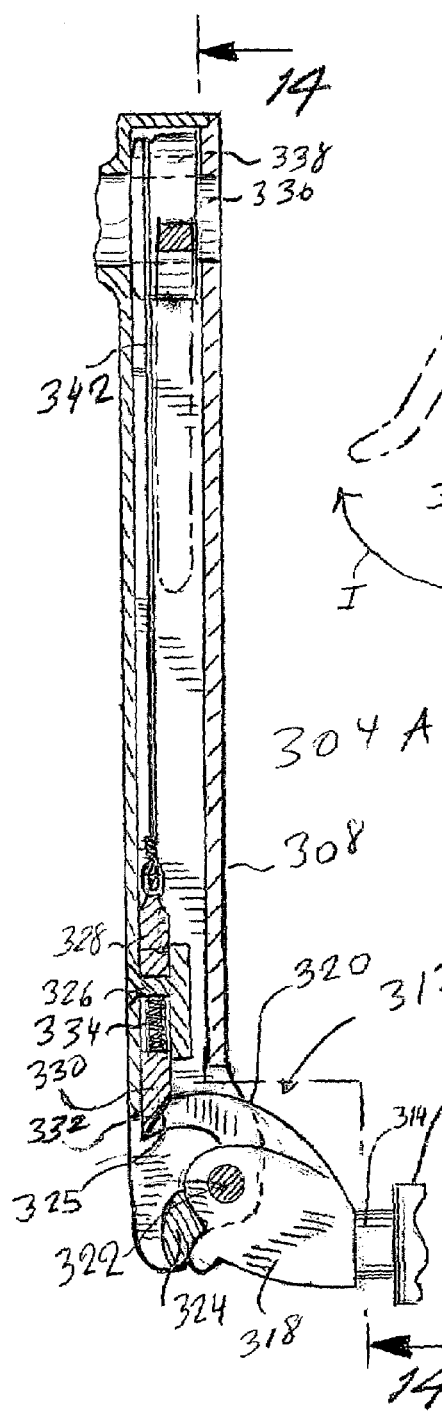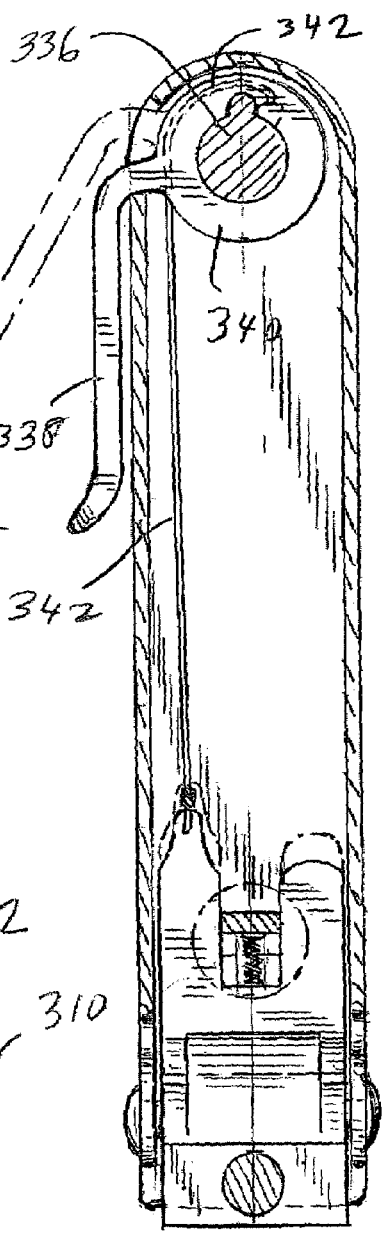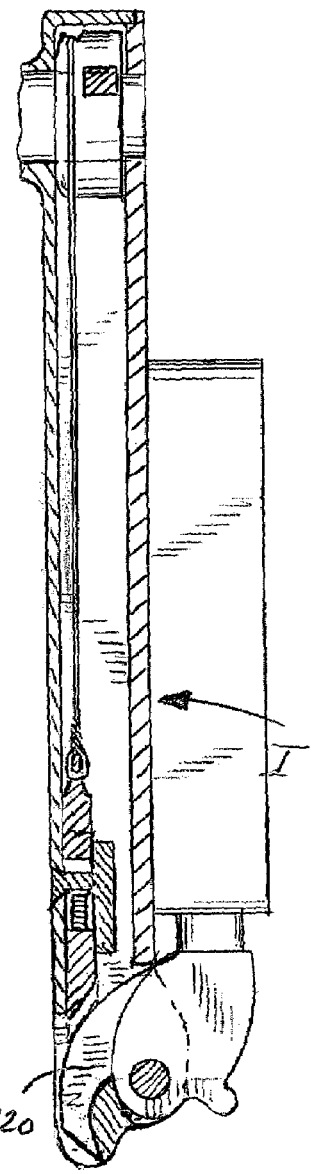

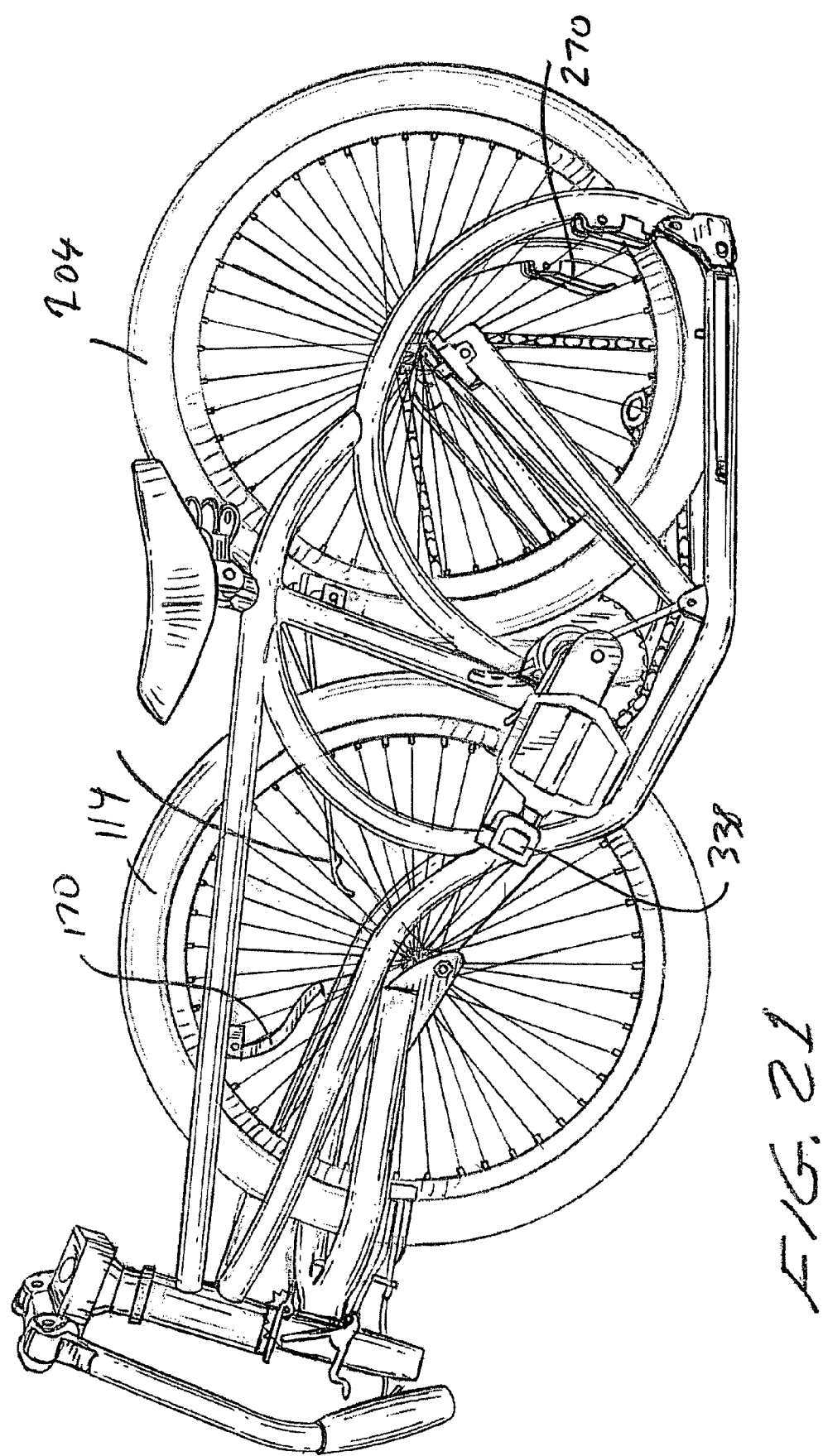

FOLDING BICYCLE

BACKGROUND OF THE INVENTION a. Field of Invention

This application pertains to a bicycle that has a solid frame and several members, including front and rear wheels, handle bars, and foot pedals that fold into a cavity formed in the frame to thereby provide a compact package.

b. Description of the Prior Art

The modern bicycle has been invented in the 19$^{th}$ century and is still very popular as a means of transportation and recreation all over the world. While various improvements have been made over the years making the bicycle faster, lighter, easier to use, and safer, its basic shape, structure and operation has not changed. One basic problem that still remains with the standard bicycle is that even if it is made of light materials, it is relatively large and difficult to store and carry.

While folding bicycles have been made in the past, none of them are really popular (especially with a younger crowd). One problem with known folding bicycles is that they are clumsy and difficult to fold. Another problem is that they require a lot of space to open and close. A further problem is that they are difficult to operate. Yet another problem with most folding bicycles is that they use either a non-standard structure and frame, or have a frame that is folded or otherwise distorted. Inherently, a bicycle with a folding frame is unstable and overly complicated.

SUMMARY OF THE INVENTION

A collapsible bicycle includes a solid frame having a front frame portion, a bifurcated center frame portion arranged to define a first storage space, and a bifurcated rear frame portion arranged to define a second storage space; a front wheel portion including a handle bar assembly attached to said front frame portion and a front wheel, said front wheel attached to said handle bar and being pivotable between an open position and a closed position, in said closed position, said front wheel being disposed in said first storage space; and a rear wheel portion attached to said rear frame portion and including a rear wheel and a rear wheel pivotable between an open position and a closed position, in said closed position said rear wheel being disposed in said second storage space. An adjustable seat support and a seat attached to said seat support.

The frame includes two hollow vertical members and the adjustable seat support includes two rods telescopically received within said hollow vertical members and a latch securing said two rods at one of several positions. A chain drive is also provided that includes pedals, a chain wheel and a chain for rotating said rear wheel.

The bicycle may include a locking hinge coupling said pedals to said chain wheel, said locking hinge selectively positioning said pedals into one of an operational and a closed positions.

The bicycle may have its front portion include a locking hinge selectively coupling said front wheel to said chain wheel, said locking hinge selectively locking said chain wheel to said handle bar assembly in said open position.

In addition, the bicycle may include a front latch for locking said front wheel in said closed position.

The bicycle may have the rear portion include a first rear latch selectively locking said rear wheel to said frame in said open position.

BRIEF DESCRIPTION OF THE INVENTION

FIGS. 5–7 show the top end of the front fork being selectively disengaged from the frame;

FIGS. 11 and 12 show the locking mechanism for the seat and the manner in which the seat is disengaged and lowered to the locked position;

FIGS. 13–15 show details of the pedal and how it is pivoted to a folded position;

FIG. 21 show a side view of the folded bicycle.

DETAILED DESCRIPTION OF THE INVENTION

Figure 1:
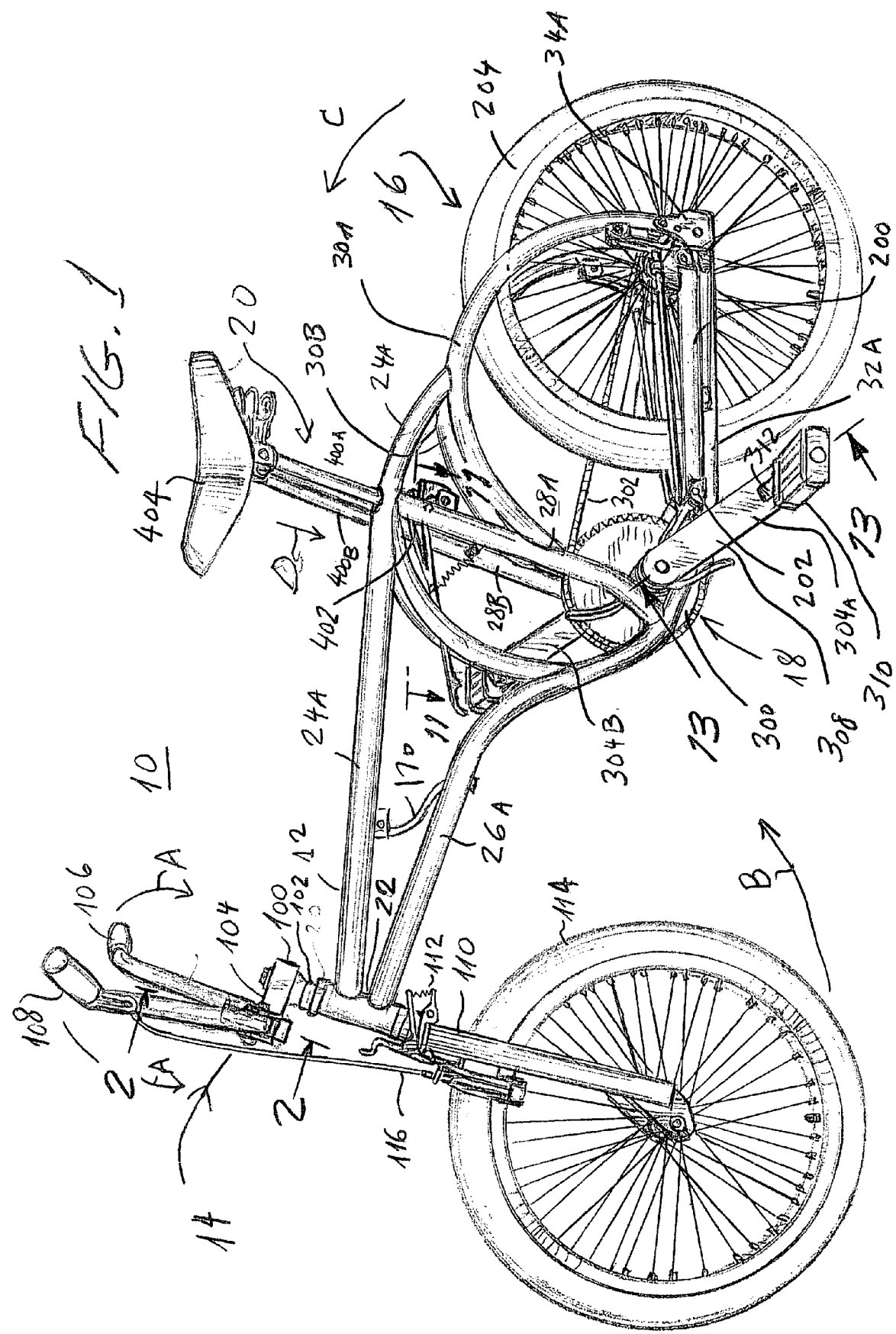
FIG. 1 shows a side view of a bicycle constructed in accordance with the present invention.

Referring first to FIG. 1, a bicycle 10 constructed in accordance with this invention includes a solid frame 12, a front portion 14, a rear portion 16, a drive portion 18 and a seat portion 20. FIG. 1 illustrates the bicycle 10 in an open or operational configuration. In this position, the bicycle 10 looks just like any other standard bicycle and operates in the same manner.

Importantly, the bicycle 10 can be folded or collapsed into a closed configuration so that it can be stored easily in a locker, closet, or even the trunk of a car. As it will become apparent from the following description, as the bicycle is collapsed, its frame 12 remains an integral single unit which does not change shape while the other portions recited above are all pivoted and/or folded with respect to the frame.

In order to provide a clear understanding of the structure and components of bicycle 10, its elements are first described in detail in the open configuration, and then a description will be provided of how each of the portions described above pivots or folds into the frame 12.

Figure 8:
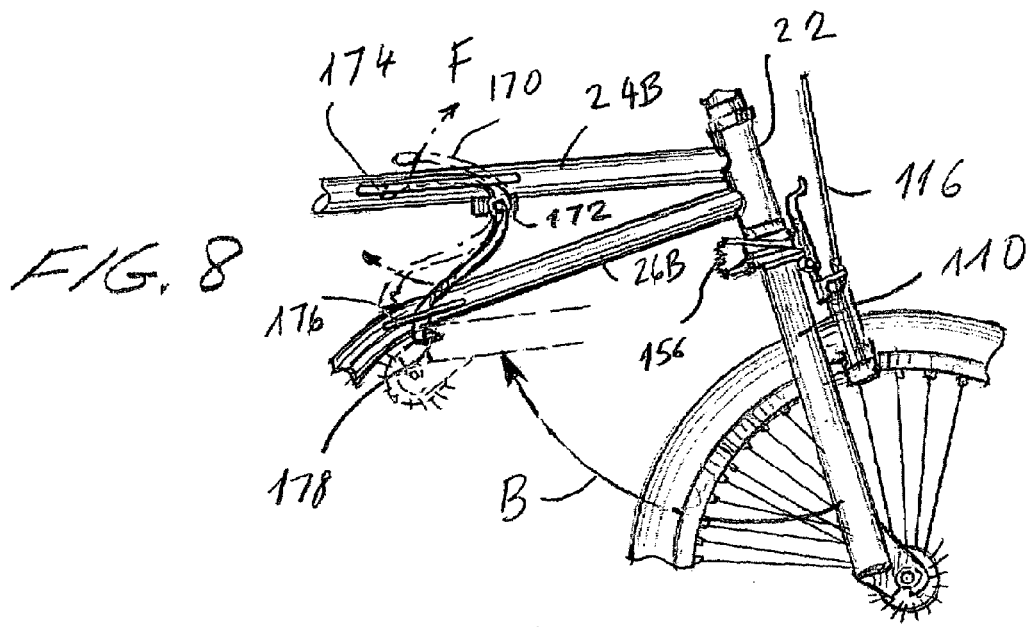
FIGS. 8–10 show a locking mechanism engaging the front fork in the locked position.

Frame 12 includes a sleeve 22 interfacing with and supporting the front portion 14. Welded to the sleeve 22 there are two upper members 24A, 24B, and two diagonal members 26A, 26B. (Members 24B, 26B are seen in FIG. 8). Each upper of the upper members 24A, 24B is connected to the respective diagonal member by a respective, generally vertical, member 28A, 28B. Members 24A, 24B extend past members 28A, 28B and are attached to respective arcuate members 30A, 30B. The diagonal members 28A, 28B have horizontal extensions 32A, 32B. The distal ends of the extensions 32A, 32B are attached to the distal ends of the arcuate members 30A, 30B to form support plates 34A, 34B, respectively. As discussed above, frame 12 is solid, meaning that its elements do not pivot or fold as the bicycle is collapsed.

The front portion 14 includes an L-shaped axle with a leg 102 extending into the sleeve 22, and an arm 104 extending forwardly. Two handle bars 106A, 106B are attached to and, in the open configuration, they extend outwardly of arm 104 in the usual manner. The bottom part of leg 104 is attached to a fork 110 by a locking hinge 112. The fork 110 holds a standard front wheel 114 in the usual manner. A standard hand-brake 116 is provided in front of the fork 110. Briefly, portion 14 is collapsed by causing the two handles 106A, 106B to pivot downward with respect to arm 104, as indicated by arrows A (described in more detail in conjunction with FIGS. 2–4) and by causing the fork 110 and wheel 114 to pivot backward in the direction indicated by arrow B (described in more detail in conjunction with FIGS. 5–10).

The rear portion 16 includes a fork 200 that is attached to the extensions 32A, 32B by a locking hinge 202. The distal end of the fork supports the rear wheel 204. Wheel 204 has a standard axle with a built-in optional friction brake and other standard elements. As described more fully below, the rear portion is collapsed by pivoting the wheel 204 upward around hinge 202 toward the frame 12, as indicated by arrow C.

Figure 19:
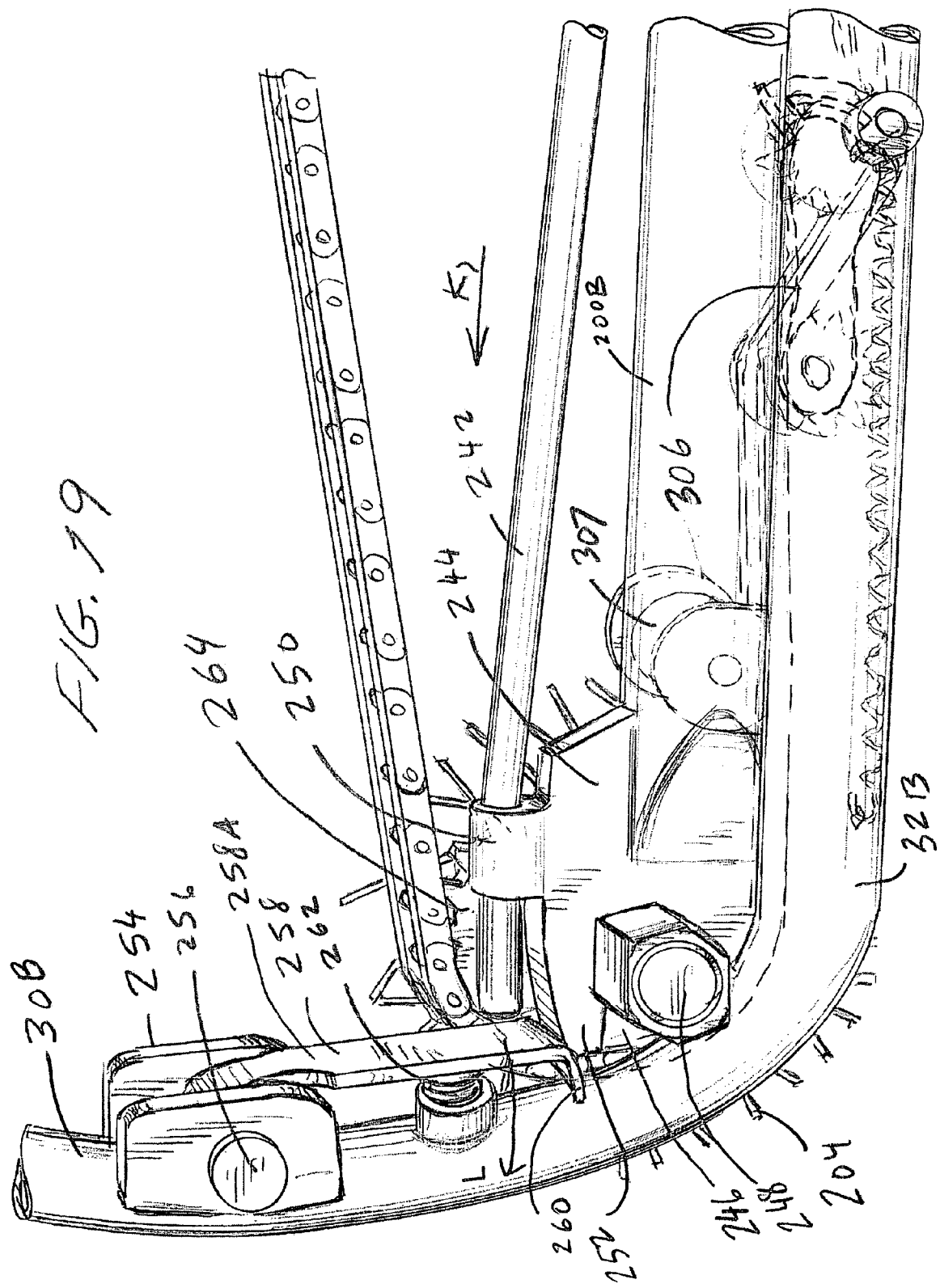

The drive portion 18 includes a standard chain wheel 300, a chain 302, two paddle assemblies 304A, 304B and a derailleur assembly 306 (shown in FIG. 19). The pedal assemblies 304A, 304B each include an arm 308 and a pedal 310 supported by a locking hinge 312. In the position shown in FIG. 1, the pedals 310 are rotatable about a respective horizontal axle 314 in the usual manner to thereby propel the bicycle forward. As part of the collapsing process, the axles are rotated by about 90 degrees with respect to the hinges 312 so that the pedals 310 become parallel to arms 308, as shown in FIGS. 13–15.

Finally, the seat portion 20 includes two posts 400A, 400B that are inserted into vertical members 28A, 28B respectively. The posts can be moved up and down as desired and their position is controlled by a latching mechanism 402 described in more detail in FIGS. 11 and 12. The posts 400A, 400B support a seat 404. When the bicycle is collapsed, the seat 404 is lowered toward the frame, as indicated by arrow D.

Figure 2:
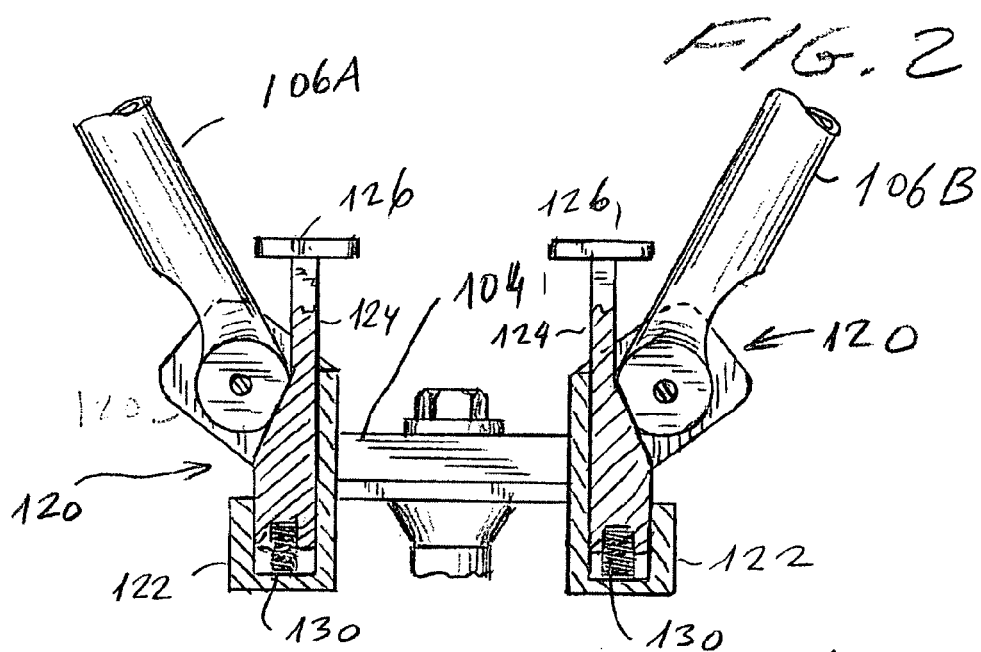
FIGS. 2–4 show details in respective top views of the handle bars being selectively folded into a downward storage position.
Figure 3:
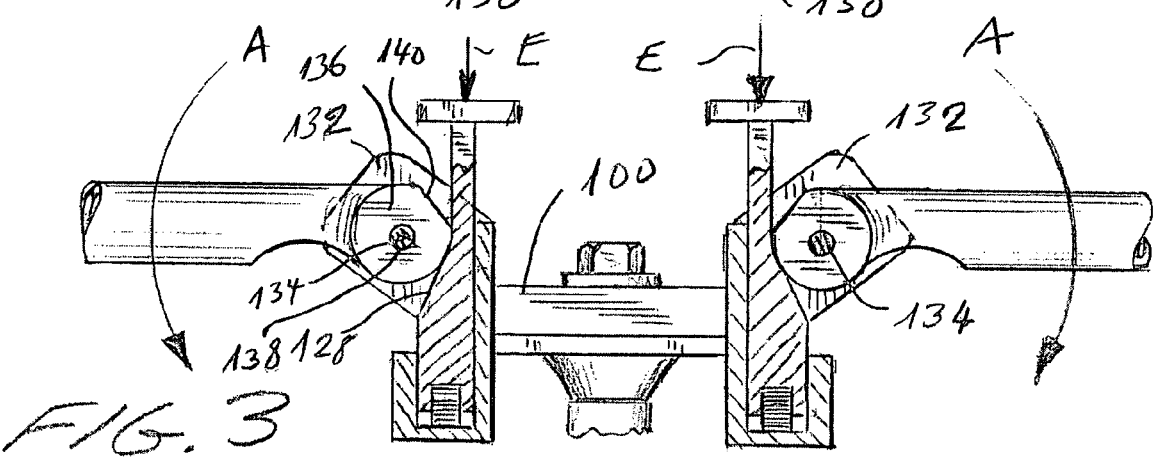
Figure 4:
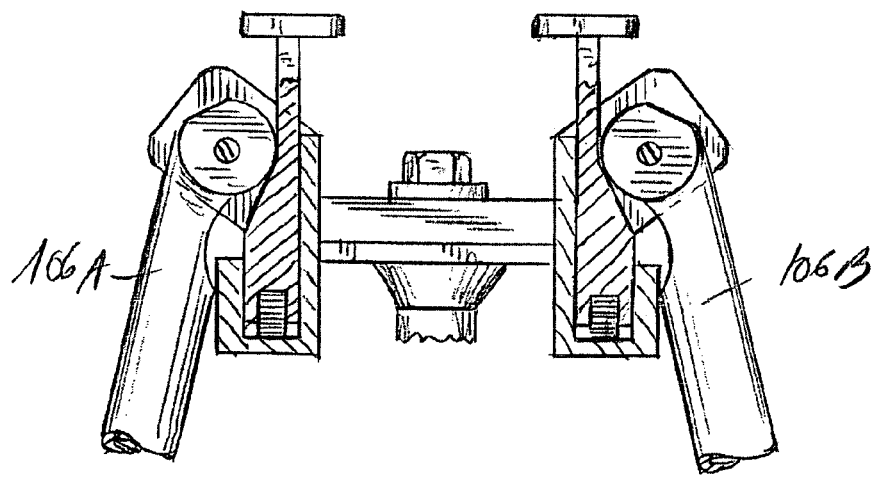

Referring now to FIGS. 2–4, each of the handles 106A, 106B are attached to the arm 104 by a respective locking hinge 120. Each locking hinge includes a housing 122 secured to arm 104. The housing 122 is shaped to allow a trapezoidal bar 124 to move vertically up and down. Each bar 124 is terminated by a head 126 and has an oblique surface 128 on one side. Each bar is urged upward by a coil spring 130.

The housings 122 further include a sidewall 132 supporting a horizontal pin 134. The handle bars 106A, 106B are formed on their bottom with a horizontal leg 136 with a hole 138, with the pin 134 extending through the hole 138, thereby allowing the handles to pivot with respect to the housing 122. Each leg 136 has a generally D-shaped cross section, with a flat segment 140. As shown in FIG. 2, when the handle bars 106A, 106B are in the upright, or operational position, the flat segment 140 is in contact with the oblique surface 128 in bar 124 and this contact is what maintains the handles in this position. Any downward force on the handle bars 106A, 106B is resisted by the bars 124 and therefore the handle bars are maintained in their upright positions very solidly and securely, without any play between the handle bars and the housing 122, or frame 12.

The two heads 126 are positioned relatively close to each other so that they can be pressed down simultaneously, as shown by arrows E in FIG. 3, causing bars 124 to move downwards. This action causes the oblique walls 128 to disengage from segments 140. As a result, the handle bars 106A, 106B then pivot around the axis of pins 134 until they move down to the position shown in FIG. 4. The pins 134 can be made integral with the housing, in which case the handle bars pivot around the pins, or the pins can be made integral with the handle bars, in which case the pins pivot together with the handle bars. From the positions shown in FIG. 4, the handles can be raised easily back to the upright position. When the handle bars do reach their upright position, the bar 124 jumps up because of the action of spring 130 and locks the respective handle bar in place.

Referring now to FIGS. 5–10, the fork 110 and front wheel 114 are pivoted with respect to the frame as follows. The fork 110 has a flange 150 seen in detail in FIGS. 6 and 7, with two holes 152, 154. Each hole houses a respective pin 152A, 154A. Attached to the bottom of leg 102, under sleeve 22 there is a flange 161 with a hole 165 receiving pin 152A. The flange 161 also has an extension 163 receiving an end of a coil spring 156.

A clamp 160 is used to secure the fork 110 to the flange 161. The clamp 160 has a bottom portion 162 engaged by pin 154A, a top portion shaped to form a handle 164, a lip 166 and an arm 168. The end of the arm 168 is attached to the other end of coil spring 156, as seen in FIG. 5.

In the operational position of FIG. 5, the fork 110 is aligned or coaxial with the leg 102. In this position, as seen in FIGS. 5 and 6, the lip 166 is positioned over, and is in contact with a top surface of flange 161. The spring 156 biases the clamp 160 in the clockwise direction, thereby causing the clamp 160 and its lip 166 to push down on flange 161. In this manner the fork 110 and wheel 114 are held securely to the leg 102 without any play therebetween, in a manner similar to a standard bicycle. In order to release the fork 110 and allow it to pivot, the handle 164 is pivoted forward, around pin 154A, in the direction of arrow E, against the biasing of the spring 156. This action causes the lip 166 to disengage and move away from the flange 161, and the gravity then causes the wheel to pivot about pin 152A and move backward as indicated by arrow B.

Preferably, as seen in FIG. 8, there are two springs, one on each side of sleeve 22 to insure that the fork 110 is held securely.

Figure 9:
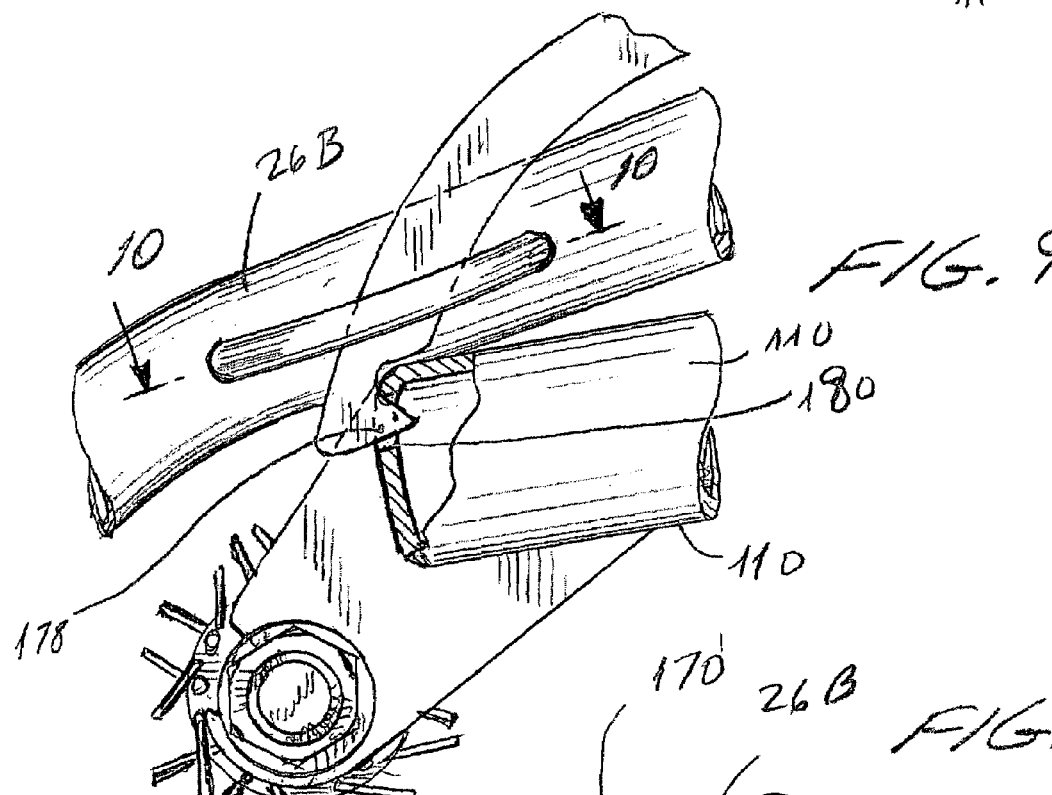
Figure 10:
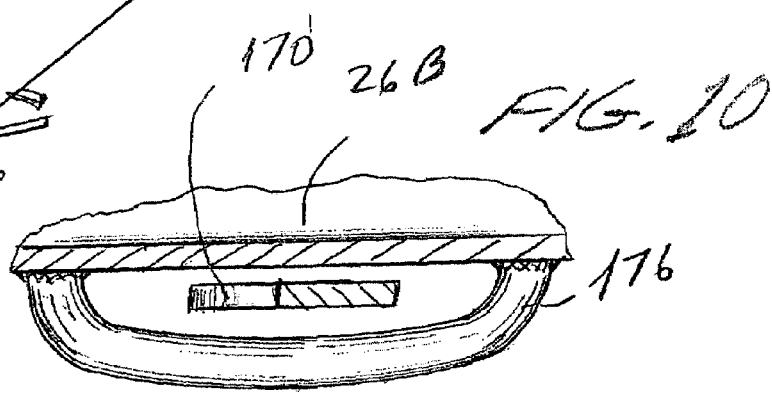

Referring to FIGS. 8–10, a curved or S-shaped latch 170 pivoting on a pin 172 attached to member 24B. Two brackets 174, 176, attached to members 24B, 26B guide and limit the movement of the latch laterally so that the latch won't bend sideways and cause injury to a biker. The latch 170 terminates with a hook 178. The bottom of fork 110 is formed with a hole 180. As previously mentioned, the fork 110 and wheel 114 are released by moving the clamp 160 to move forward. Gravity or a push with the hand causes the fork 110 and wheel 114 to move backward until the fork 110 is substantially horizontal and the hook 178 enters into hole 180 and latches the fork 110 as shown in FIGS. 8 and 9. The fork 110 and the wheel 114 are maintained in this closed position by the latch 170.

In order to return the wheel 114 to the operating position, while the frame 12 is held up in the air, the latch 170 is raised upward, as indicated in FIG. 8 by arrow F. This action causes the hook 178 to disengage from hole 180 thereby releasing the fork 110. The fork 110 and wheel 114 are then forced by gravity to swing forward until the clamp 160 engages the flange 161 thereby locking the fork 110 into the operational configuration.

FIGS. 11 and 12 show the structure of seat portion 20. It includes hollow posts 400A, 400B supporting seat 404, as well as a lever 406 secured to a pin 410. Pin 410 extends between two brackets 408 that are mounted member 28A, 28B. Pin 410 also supports two claws 414 disposed adjacent to members 28A, 28B. Members 28A, 28B each have a hole 416. Posts 400A, 400B are provided with a plurality of axially spaced holes 420 similar in size and shape to holes 416. A spring 412 biases the lever 406 toward a downward position. In this position, the claws 414 are forced through holes 416 into one of the holes 420.

If a biker wants to change the height of seat 404, all he has to do is lift the lever 406 upward in the direction indicated by arrow G. This action causes the pin to rotate clockwise thereby withdrawing the claws 414 from holes 420 and thereby leaving the posts free to move up or down telescopically within the members 28A, 28B, as indicated by arrow H. Moreover, for the closed position of the bicycle, preferably, the seat is moved all the way down.

FIGS. 13–15 show details of the pedal assembly 304A. As seen in these drawings, the pedal 310 is rotatably mounted on a shaft 314. Shaft 314 is mounted on a locking hinge 312. The locking hinge 312 includes a bracket 318 receiving shaft 314 and a claw 320 extending into the arm 308. The hinge 312 further includes a pin 322 supported by a sidewall 324 of the arm 308. Claw 320 is terminated with a surface 325 disposed at an angle of about 45 degrees. Also inside arm 308 there is provided a ledge 326. A rod 328 passes through a hole (not shown) in ledge 326 and has a bottom member 330 terminating in a surface 332. Surface 332 is also disposed at an angle of 45 degrees. A spring 334 is disposed between ledge 326 and member 330 and bias the member 330 in a downward direction so that the surfaces 332 and 326 are in contact with each other. As a result of this structure, the locking hinge 312 holds the axle 314 and pedal 310 in a horizontal orientation and does not allow the pedal to rotate with respect to the axis of pin 322.

The arm 308 is mounted on a standard shaft 336 supporting the chain wheel 300. Mounted around this shaft is a lever 338 with a sleeve 340. A thin cable 342 has one end secured to the sleeve 340 and it is at least partially trained around this sleeve, as seen in FIG. 14. The other end of the cable 342 is secured to rod 328, as seen in FIG. 13. The lever 338, sleeve 340 and cable 342 are constructed and arranged so that when lever 338 is rotated around shaft 336 in the direction of arrow I, more of the cable 342 is wound onto the sleeve 340 causing the rod 328 and its bottom member 330 to lift upward. This action causes the surface 332 to lift upward and disengage from surface 325. Once contact between the two surfaces 332, 325 is broken, the pedal 310 is free to turn with respect to pin 322. The actual rotation or pivoting may be done manually, or a spring may be used to urge the pedal to pivot in the direction of arrow J in FIG. 15. During this motion, the claw 320 is pivoted behind the pin 322 as seen in FIG. 15. Once the claw 320 pivots past surface 332, the lever 338 can be released and surface 332 is returned toward its downward position thereby engaging the claw 320 and maintaining it in the position shown in FIG. 15. The pedal 310 is rotated to the position of FIG. 15 while the bicycle is folded toward its closed position.

As the bicycle returns to the open position, the pedal 310 can be returned to the position of FIG. 13 by hand or foot. When the pedal reaches its horizontal position, the two surfaces 332 and 325 come into contact once again thereby immobilizing the pedal in the position of FIG. 13.

FIGS. 16–20 illustrate the operation of the rear portion 16. The rear portion 16 has three functions: it provides the mechanism for moving the rear wheel 204 up to a position adjacent to the seat, it provides for movement of the chain wheel 300 upward, and it provides for the tightening of the chain 302 so that it does not get tangled up while the bicycle is in the closed position. The three functions and the elements performing these functions are interconnected and therefore they are described together.

Figure 16:
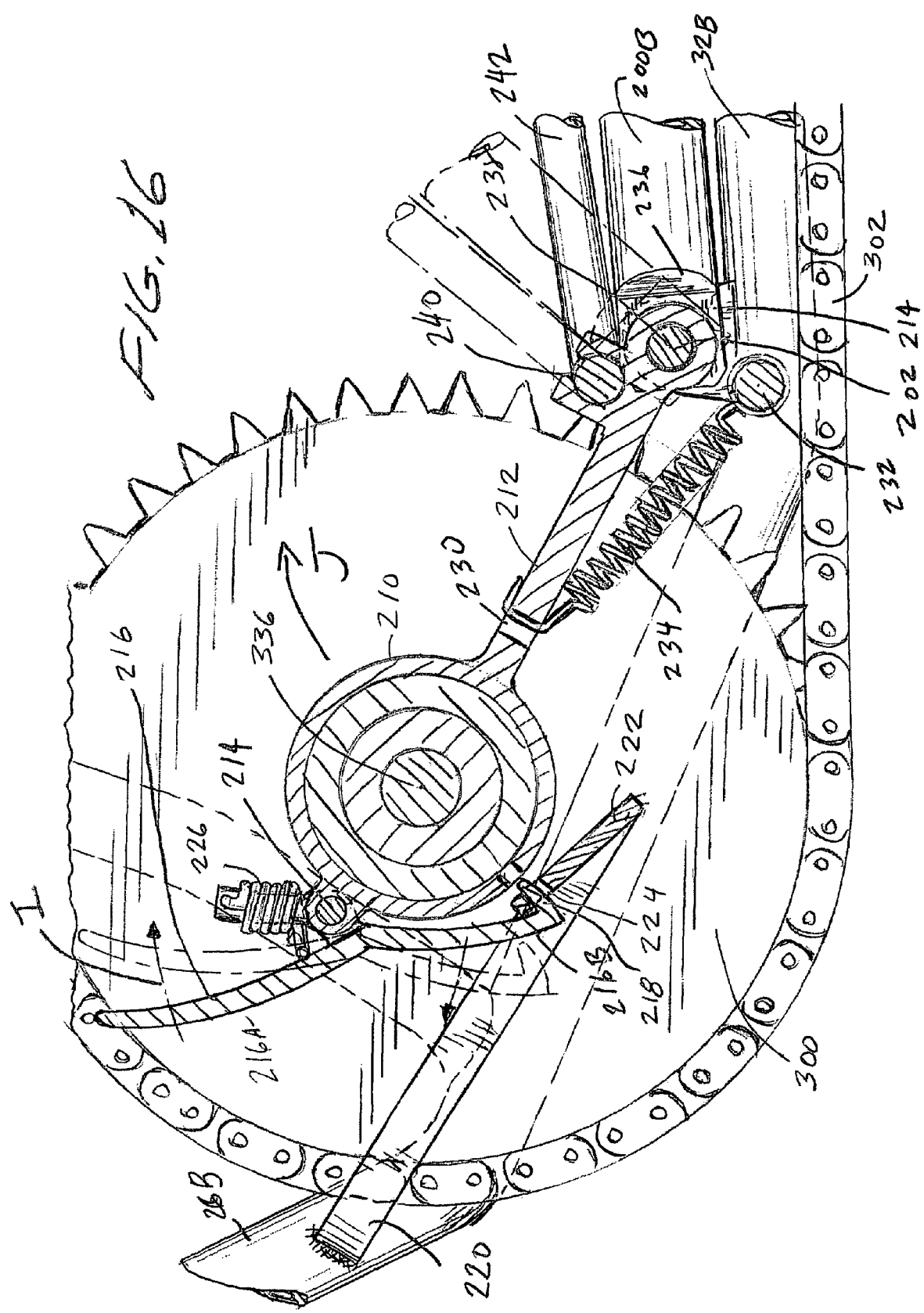
FIGS. 16–19 shows the mechanism for folding the rear wheel.
Figure 17:
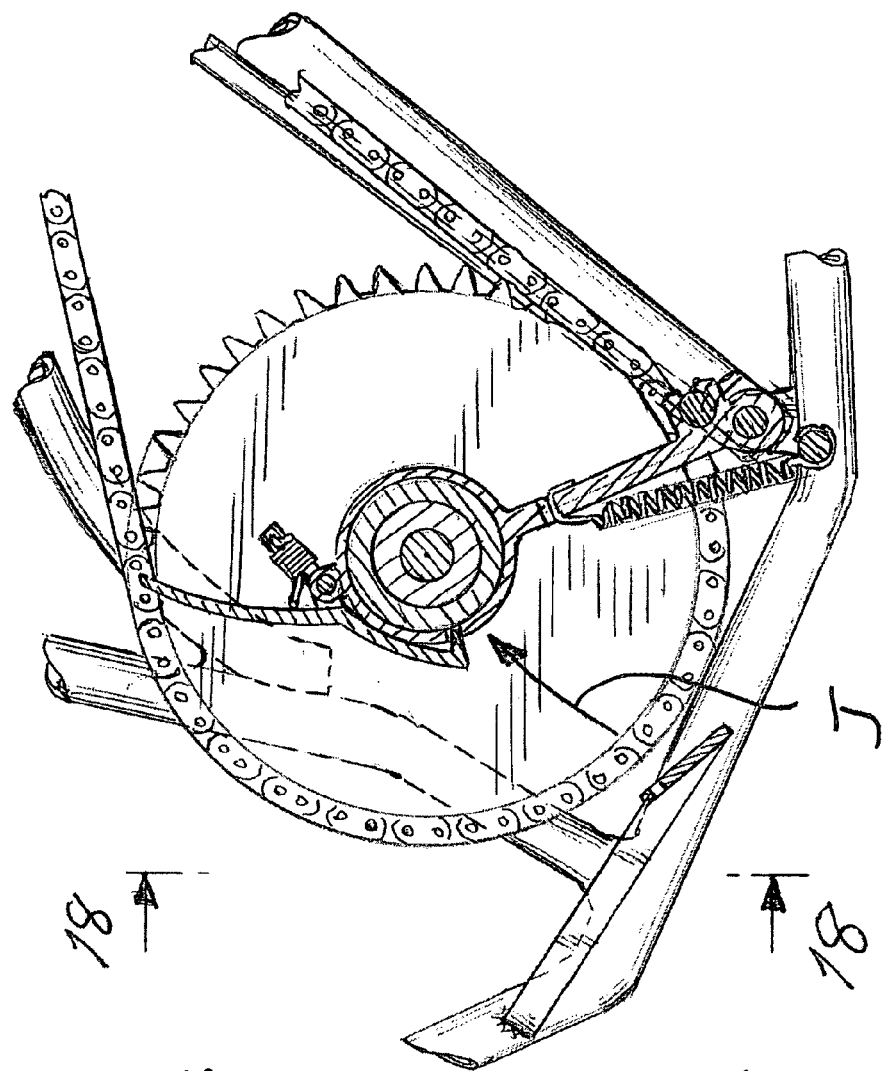
Figure 18:
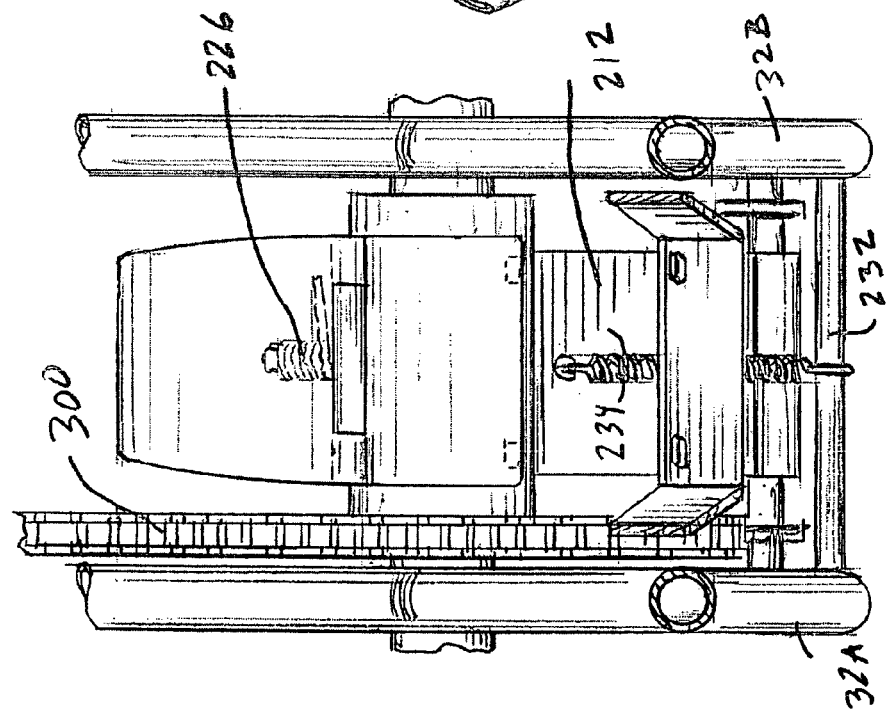

Referring first to FIGS. 16 and 18, the chain wheel 300 is supported by a sleeve 210 mounted on an arm 212. The sleeve 210 has a pivoting pin 214 supporting a curved plate 216. The curved plate 216 can pivot about pin 214 with respect to sleeve 210. The plate has two portions 216A, 216B. Portion 216B is terminated with a claw 218. A bar 220 is attached to frame member 26B and extends diagonally downward as shown. The bar 220 terminates with a flat portion 222 with a hole 224. When the bicycle 10 is in its operational mode, a spring 226 attached to the pin 214 applies a biasing force in the counterclockwise direction on plate 216 forcing the claw 218 into opening 224 of bar 220. This action fixes and maintains the position of the chain wheel 300 with respect to the frame 12 to allow a biker to use the bicycle in the normal manner. Arm 212 includes a hole 230. A pin 232 is provided on extension 32B. A spring 234 extends from the pin 232 and engages hole 230. This action applies an additional biasing force on the wheel 300 downward to make it steady and insure that the wheel 300 stays in the position shown even if the bicycle is subjected to shaking, for example, when it hits an obstruction.

As discussed above, the back portion includes a fork 200 holding the back wheel 204. The fork 200 is formed of two segments 204A and 204B. In the operational configuration, the segments 200A, 200B are disposed approximately in parallel with the frame extensions 32A, 32B and are interconnected by the hinge 202. As shown in FIG. 16, the hinge 202 is formed by a bracket 236 attached to frame extension 32B and a pin 238. The pin 238 supports an end of arm 212 and an end of fork segment 200B. Adjacent to pin 238, arm 212 has an opening 240. This opening 240 receives and engages the end of a bar 242. Bar 242 is generally in parallel to fork segment 204B.

Referring now to FIG. 19, fork segment 204B terminates with a plate 244. Plate 244 has an opening 246 receiving the shaft 248 holding the rear wheel 204. The plate 246 also has a longitudinal sleeve 250 arranged to receive and guiding the end of rod 242. The plate 246 is terminated with a tongue 252. The frame extension 32B is continuous with arcuate frame member 30B. Attached to frame member 30B is a bracket 254 holding a pin 256. A lever 258 is pivoting around pin 254 and is terminated with a horizontal portion 260. A spring 262 is disposed between arcuate member 30B and lever 258 and biases the lever 258 away from member 30B as shown. In this position, the horizontal portion 260 is in contact with the tongue 252 and keeps the portion 200B in a horizontal position. Rod 242 passes through the sleeve 250 and terminates adjacent to a vertical surface 258A of lever 258. Another rod similar to rod 242 is disposed on the other side of the bicycle and extends adjacent to a lever essentially identical to lever 258.

In the position shown in FIGS. 1, 16 and 19, the chain 302 passes over chain wheel 300, and, as shown in FIG. 19 to another chain wheel 264 on the axle of the rear wheel 204. From the chain wheel 264 the chain 302 returns through derailleur 306 back to chain wheel 300 in the usual manner for advancing the bicycle.

The rear wheel 204 is collapsed as follows. Returning to FIGS. 16, the plate 216 is positioned so that when the front wheel 114 is collapsed backward, the wheel 114 comes into contact with the plate 216 (and more specifically, the plate portion 216A). This action causes the plate 216 to pivot in the clockwise direction as indicated by arrow I, and to retract the claw 218 from hole 224 thereby disengaging the plate 216 from bar 220. The front wheel 114 moves further back causing the chain wheel 300 and arm 212 to pivot clockwise, as shown by arrow J in FIG. 16. This pivoting of arm 212 causes the rod 242 to move backwards.

Returning to FIG. 19, as the rod 242 (and the corresponding rod on the other side of the wheel 204) moves backwards, in the direction indicated by arrow K, the end of rod 242 comes into contact with surface 258A and thereafter the rod 242 pushes the lever 258 so that the lever pivots clockwise, as indicated by arrow L about pin 256. This movement of lever 258 causes its segment 260 to slide off and disengage from the tongue 252. This action occurs simultaneously on both sides of wheel 204. Once these two elements are disengaged, the weight of the frame 22 causes it to move downward so that the frame lowers over and envelopes a substantial portion of the rear wheel 204. Because fork segment 200B is attached to pin, as the frame 22 moves downwards over the wheel 204, the wheel 204 and fork portions 200A, 200B pivot clockwise in the direction shown by arrow M in FIG. 20.

Arcuate member 30B is also provided with a handle 270. The handle is pivotably attached to the member 30B by a pin 272. A spring mounted on the pin (not shown) is biasing the handle 270 toward the position shown in FIG. 20. The handle includes a flat shoulder 274 and a caming surface 275. A bracket 276 is used to guide and control the movement of the handle 270. As discussed above, after the rod 242 releases the segment 200B from lever 258, these two latter members start rotating clockwise as indicated by arrow M. As this motion continues, the end of the rod 242 hits the caming surface 275 and causes the handle to move slightly outwards until the end of rod 242 clears the handle. The wheel 204, the frame 20, the segment 200B and the rod 242 are sized and shaped so that as the wheel 204 goes into the frame as far as it can, the end of the rod 242 clears the handle 270. The handle 270 returns to its original position and the surface 274 comes into contact with the end of the rod 242. This action takes place substantially simultaneously on both sides of the frame. The wheel 204 has now reached its closed position and is maintained in this position by the interaction between handle 270 (and its surface 274) and the end of rod 242.

Figure 20:
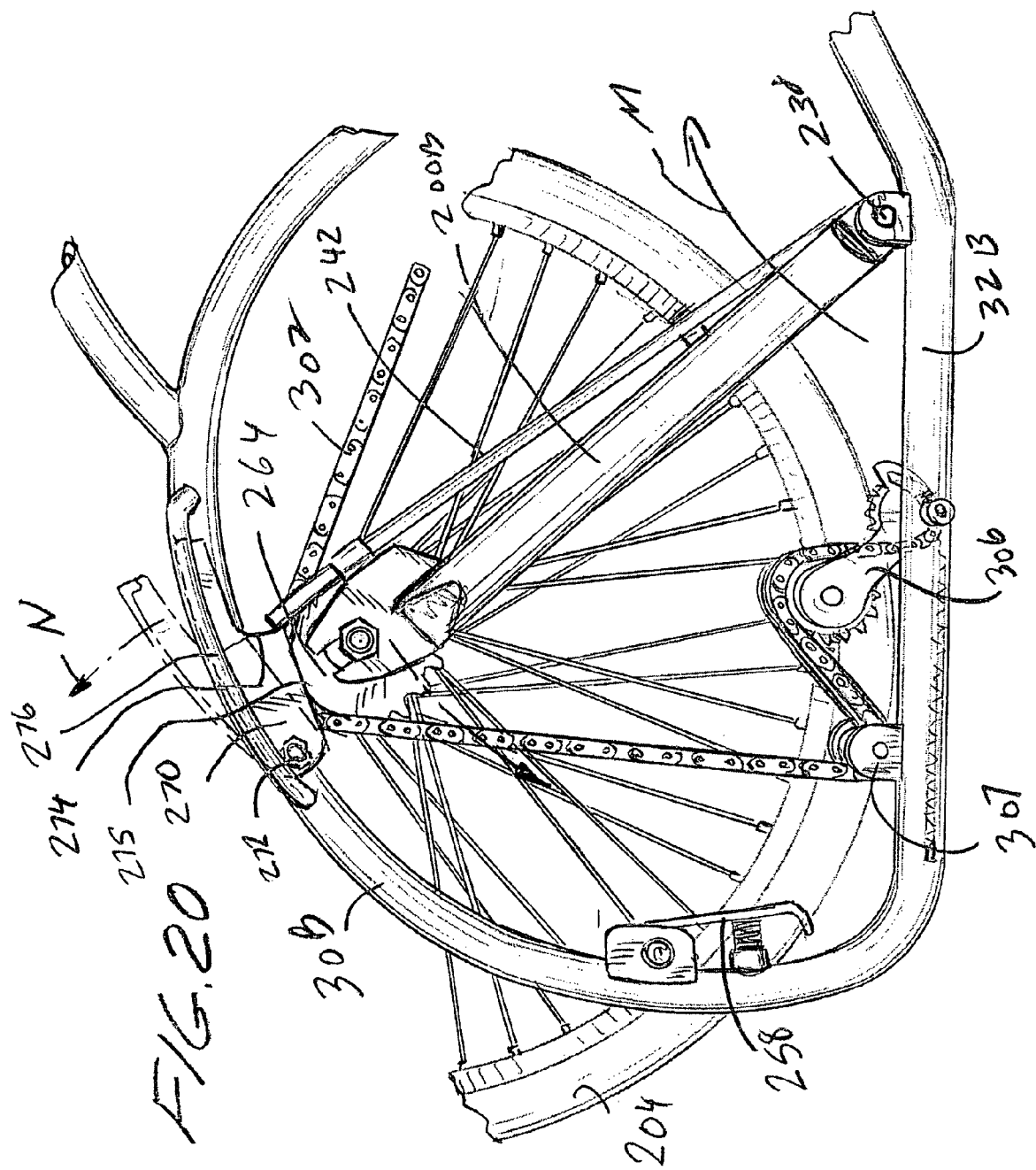
FIG. 20 shows details of how the chain path is adjusted while the back wheel is folded.

The frame extension 32B is provided with an extra small wheel 307. Between the derailleur 306 and the chain wheel 264, the chain passes over the wheel 307 as shown in FIG. 20, the wheel being positioned to insure that the chain 302 is not lose and tangled up while the wheel 204 is moving into and out of the frame.

The wheel 204 can be released by lifting the rear portion of the bicycle and pivoting handle 270 as indicated by arrow N. This action causes the surface 274 to disengage from rod 242 and the wheel 204 is then allowed to dropped out of the frame until the tongue 256 falls below the portion 260 of lever 258 (FIG. 19).

The closed configuration of the bicycle is shown in FIG. 21. This configuration is made possible by the bifurcate nature of the frame so that both the front and rear wheels can be adequately held between the respective frame members without breaking the same. Obviously, this configuration is small and compact and has no extraneous members that could interfere with the movement of a person carrying it. The bicycle can also be stored in this configuration easily.

The bicycle 10 is unfolded or expanded from the closed configuration of FIG. 21 to the open or operational configuration of FIG. 1 as follows. First, the two handle bars 106, 108 are folded back to the upward position. Next, the front end of the bicycle 10 is lifted with one hand holding one of the handle bars or the frame 20 and the latch 170 is elevated. The wheel 114 drops down and swings forward until its fork is attached to the arm 102 as discussed above.

Next, the rear of the bicycle 10 is lifted and the handle 270 is raised allowing the rear wheel 204 to dropped down.

Next, the pedals 310 are released by pulling on levers 338. Finally the seat is adjusted by raising lever 406.

Thus, as can be seen from the above description, the bicycle can be quickly collapsed from the open to the closed configuration and then back to the open configuration in a couple of quick and easy steps. Moreover, the bifurcated frame allows the wheels and other elements to be collapsed effectively within the frame thereby insuring that in the collapsed or closed configuration the bicycle requires a relatively small amount of space.

Numerous modifications may be made to this invention without departing from its scope as defined in the appended claims.

I claim:

1. A collapsible bicycle comprising:
a solid frame having a front frame portion, a bifurcated center frame portion arranged to define a first storage space, and a bifurcated rear frame portion arranged to define a second storage space;
a front wheel portion including a handle bar assembly attached to said front frame portion and a front wheel, said front wheel attached to said handle bar and being pivotable between an open position and a closed position, in said closed position, said front wheel being disposed in said first storage space;
a rear wheel portion attached to said rear frame portion and including a rear wheel pivotable between an open position and a closed position, in said closed position said rear wheel being disposed in said second storage space;
an adjustable seat support; and
a seat attached to said seat support;
wherein said frame includes two hollow vertical members and said adjustable seat support includes two rods telescopically received within said hollow vertical members and a first latch securing said two rods at one of several positions.

2. The bicycle of claim 1 wherein said frame further includes a locking hinge selectively locking said chain wheel to said frame.

3. The bicycle of claim 1 further comprising front latch for locking said front wheel in said closed position.

4. The bicycle of claim 1 wherein said rear portion further includes a first rear latch selectively locking said rear wheel to said frame in said open position.

5. The bicycle of claim 4 wherein said rear portion further includes a second rear latch selectively locking said rear wheel to said frame in said closed position.

6. A collapsible bicycle comprising:
a solid frame having bifurcated elements defining first and second storage spaces;
a front fork holding a front wheel;
a front locking hinge attached to said front fork and selectively pivoting said front fork between an open position in which the front wheel is operational and a closed position in which said front wheel is stored in said first storage space;
a rear fork holding a rear wheel;
a rear locking hinge attached to said rear fork and pivoting said rear wheel between an open position in which said rear wheel is operational and a closed position in which said rear wheel is stored in said second storage space;
a drive mechanism for turning said rear wheel and including a chain drive including pedals, a chain wheel and a chain coupling said chain wheel to said rear wheel; and a locking hinge coupling said pedals to said chain wheel, said locking hinge selectively positioning said pedals into one of an operational and a closed positions.

7. A collapsible bicycle comprising:

a solid frame having a front frame portion, a bifurcated center frame portion arranged to define a first storage space, and a bifurcated rear frame portion arranged to define a second storage space;

a front wheel portion including a handle bar assembly attached to said front frame portion and a front wheel, said front wheel attached to said handle bar and being pivotable between an open position and a closed position, in said closed position, said front wheel being disposed in said first storage space;

a rear wheel portion attached to said rear frame portion and including a rear wheel pivotable between an open position and a closed position, in said closed position said rear wheel being disposed in said second storage space;

a chain drive including pedals, a chain wheel and a chain for rotating said rear wheel; and a locking hinge coupling said pedals to said chain wheel, said locking hinge selectively positioning said pedals into one of an operational and a closed positions.

8. A collapsible bicycle comprising:

a solid frame having a front frame portion, a bifurcated center frame portion arranged to define a first storage space, and a bifurcated rear frame portion arranged to define a second storage space;

a front wheel portion including a handle bar assembly attached to said front frame portion and a front wheel, said front wheel attached to said handle bar and being pivotable between an open position and a closed position, in said closed position, said front wheel being disposed in said first storage space;

a rear wheel portion attached to said rear frame portion and including a rear wheel pivotable between an open position and a closed position, in said closed position said rear wheel being disposed in said second storage space;

a chain drive including pedals, a chain wheel and a chain for rotating said rear wheel; and a locking hinge assembly pivotably connecting said chain wheel to said frame; wherein said locking hinge is arranged to be released by said front wheel as said front wheel moves into said first storage space.

9. A collapsible bicycle comprising:

a solid frame having a front frame portion, a bifurcated center frame portion arranged to define a first storage space, and a bifurcated rear frame portion;

a front wheel portion including a handle bar assembly attached to said front frame portion and a front wheel, said front wheel attached to said handle bar and being pivotable between an open position and a closed position, in said closed position, said front wheel being disposed in said first storage space; and a rear wheel portion attached to said rear frame portion;

wherein said frame further includes a locking hinge, said locking hinge selectively locking said chain wheel to said frame in said open position.

10. The bicycle of claim 9 wherein said locking hinge is activated by said front wheel as said front wheel pivots into said closed position to release said chain wheel.

* * * * *